(12) United States Patent
Maier

(10) Patent No.: US 8,609,293 B2
(45) Date of Patent: Dec. 17, 2013

(54) HIGH PRESSURE TANK VALVE SEALING BY USING THE ELASTIC PROPERTIES OF O-RINGS

(75) Inventor: Oliver Maier, Worms (DE)

(73) Assignee: GM Global Technology Operations LLC, Detroit, MI (US)

( * ) Notice: Subject to any disclaimer, the term of this patent is extended or adjusted under 35 U.S.C. 154(b) by 420 days.

(21) Appl. No.: 12/896,035

(22) Filed: Oct. 1, 2010

(65) Prior Publication Data

US 2012/0082916 A1 Apr. 5, 2012

(51) Int. Cl.
*H01M 8/24* (2006.01)

(52) U.S. Cl.
USPC .......... 429/454; 429/53; 429/54; 429/55; 429/85; 251/129.15; 251/214; 251/328; 251/330; 220/581

(58) Field of Classification Search
USPC ........... 137/903; 251/129.15, 214, 328, 330; 335/255; 429/454, 53–55, 85; 220/581
See application file for complete search history.

(56) References Cited

U.S. PATENT DOCUMENTS

| | | | | |
|---|---|---|---|---|
| 6,189,561 | B1 * | 2/2001 | Burke et al. | 137/454.5 |
| 7,648,042 | B2 * | 1/2010 | Lee et al. | 220/601 |
| 2005/0253103 | A1 * | 11/2005 | Bente et al. | 251/129.15 |
| 2007/0034263 | A1 * | 2/2007 | Muller | 137/540 |
| 2009/0267342 | A1 * | 10/2009 | Haltmayer et al. | 285/82 |
| 2010/0320407 | A1 * | 12/2010 | Beneker et al. | 251/129.15 |

* cited by examiner

*Primary Examiner* — Milton I Cano
*Assistant Examiner* — Ling R Zeng
(74) *Attorney, Agent, or Firm* — Fraser Clemens Martin & Miller LLC; J. Douglas Miller

(57) ABSTRACT

A valve for a pressure vessel system includes a housing having a cavity defined by an inner surface of the housing. The housing further includes a rod aperture and a pair of fluid flow ports. An actuator is disposed adjacent the housing. The valve also includes a piston having a rod coupled to a piston head. The piston head is disposed in the cavity of the housing, and the rod disposed through the rod aperture. The rod is also coupled to the actuator. A ring seal is disposed between the piston head and an inner surface of the housing. The ring seal biases the piston head toward one of the fluid flow ports and seals the one of the fluid flow ports to close the valve when the actuator is deactivated. The ring seal is elastically deformed and the fluid flow ports are opened when the actuator is activated.

19 Claims, 1 Drawing Sheet

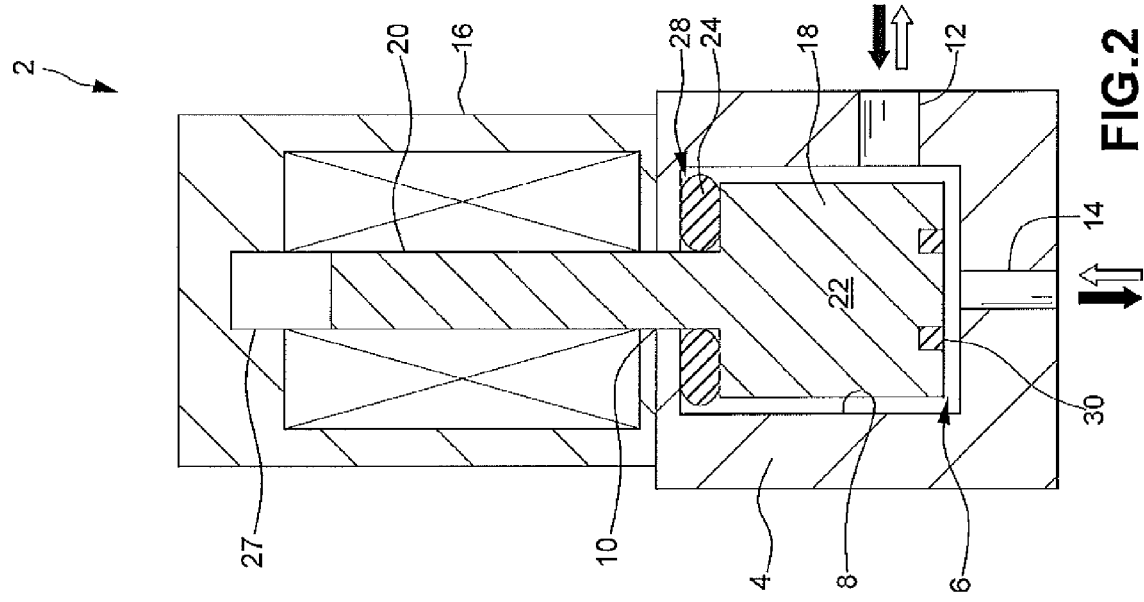
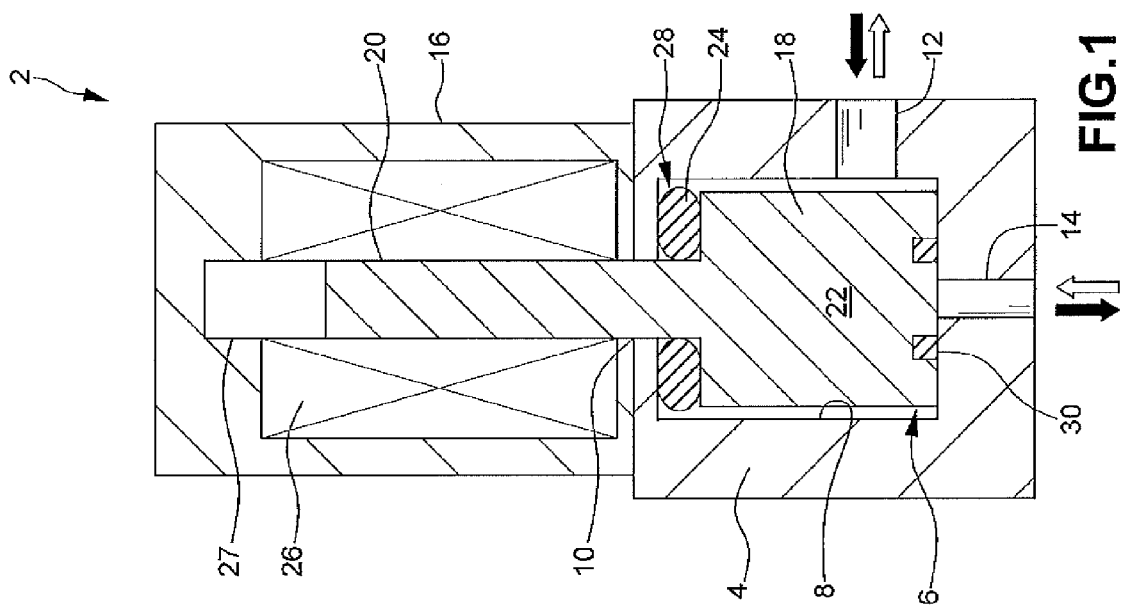

HIGH PRESSURE TANK VALVE SEALING BY USING THE ELASTIC PROPERTIES OF O-RINGS

FIELD OF THE INVENTION

The present disclosure relates to high pressure storage vessel systems for fuel cell-powered vehicles and more particularly to high pressure tank valve for the high pressure storage vessel system.

BACKGROUND OF THE INVENTION

Fuel cell power systems have been proposed as a clean, efficient and environmentally responsible power source for electric vehicles and various other applications. One type of fuel cell power system employs use of a proton exchange membrane (PEM) to catalytically facilitate reaction of fuels (such as hydrogen) and oxidants (such as air or oxygen) into electricity. Typically, the fuel cell power system has more than one fuel cell that includes an anode and a cathode with the PEM therebetween. The anode receives the hydrogen gas and the cathode receives the oxygen. The hydrogen gas is ionized in the anode to generate free hydrogen ions and electrons. The hydrogen ions pass through the electrolyte to the cathode. The hydrogen ions react with the oxygen and the electrons in the cathode to generate water as a byproduct. The electrons from the anode cannot pass through the PEM, and are instead directed through a load to perform work before being sent to the cathode. The work acts to operate the vehicle. Many fuel cells are combined in a fuel cell stack to generate the desired power.

The fuel cell power system can include a high pressure vessel or container for storing hydrogen gas for the fuel cell stack. The high pressure vessel can be charged with hydrogen gas at a filling station and the like. The hydrogen gas is transferred from the filling station to the high-pressure vessel on the vehicle to supply the hydrogen gas to the fuel cell stack as needed.

High-pressure vessels generally require high pressure shutoff valves for serviceability and to minimize hydrogen gas release to the ambient atmosphere. Typically, the shutoff valves are electrically-operated solenoid valves. The sealing of common solenoid valves is typically realized by an O-ring, which is generally mounted on a main piston inside the valve body. The solenoid valve is activated by a power source to produce a magnetic force. The magnetic force of the solenoid works against a metal coil spring disposed inside of the valve body to open the valve. The spring otherwise biases the main piston in a closed position.

When the piston is displaced by either the spring or the solenoid, there is a relative movement and a friction between the O-ring and the valve body. The level of friction depends on many parameters such as temperature, lubrication, harshness, number of cycles, age of O-ring, abrasion, etc. If the friction is too high, the piston can undesirably "stick" in the open position. Conventional electrically-operated solenoid valves are therefore known to having issues with controllability due to the friction between the O-ring and the valve body. The piston and O-ring seal also require lubrication in order to avoid the sticking and maintain the controllability of the shutoff valve.

There is a continuing need for a high pressure tank valve that minimizes friction at a piston of the high pressure tank valve, eliminates the need for lubrication of the O-ring seal, and which is optimized for manufacturability.

SUMMARY OF THE INVENTION

In concordance with the instant disclosure, a high pressure tank valve that minimizes friction at a piston of the high pressure tank valve, eliminates the need for lubrication of the O-ring seal, and which is optimized for manufacturability, is surprisingly discovered.

In a first embodiment, a valve for a pressure vessel system includes a housing having a cavity defined by an inner surface of the housing. The housing further includes a rod aperture and a pair of fluid flow ports formed therein. An actuator is disposed adjacent the housing. The valve also includes a piston having a rod coupled to a piston head. The piston head is disposed in the cavity of the housing, and the rod disposed through the rod aperture. The rod is also coupled to the actuator. A ring seal is disposed in the cavity and circumscribes the rod of the piston. The ring seal is disposed between the piston head and an inner surface of the housing. The ring seal biases the piston head toward one of the fluid flow ports formed in the housing and seals the one of the fluid flow ports to close the valve when the actuator is deactivated. The ring seal is elastically deformed and each of the fluid flow ports is unsealed to open the valve when the actuator is activated.

In another embodiment, a pressure vessel system includes the valve in fluid communication with a high pressure vessel.

In a further embodiment, a fuel cell system includes a fuel cell stack receiving hydrogen from the pressure vessel system. The pressure vessel system includes the valve in fluid communication with a high pressure hydrogen vessel.

DRAWINGS

The above, as well as other advantages of the present disclosure, will become readily apparent to those skilled in the art from the following detailed description, particularly when considered in the light of the drawings described hereafter.

FIG. 1 is a cross-sectional side elevational view of a high pressure tank valve according to an embodiment of the present disclosure, the valve shown in the closed position; and FIG. 2 is a cross-sectional side elevational view of the high pressure tank valve depicted in FIG. 2, the valve shown in the open position.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner.

FIGS. 1 and 2 illustrate a high pressure tank valve 2 according to one embodiment of the disclosure. The valve 2 is shown in a closed position (FIG. 1) and an open position (FIG. 2). The valve 2 includes a housing 4 having a cavity 6 defined by an inner surface 8 of the housing 4. The housing 4 further includes a rod aperture 10 and a pair of fluid flow ports 12, 14 formed therein. An actuator 16 is disposed adjacent the housing 4. A piston 18 having a rod 20 coupled to a piston head 22 is disposed in the cavity 6 of the housing. The rod 20 is disposed through the rod aperture 10 and coupled to the actuator 16.

The valve 2 further includes a ring seal 24 disposed in the cavity 6. The ring seal 24 circumscribes the rod 20 of the piston 18. The ring seal 24 is also disposed between the piston head 22 and the inner surface 8 of the housing 4. The inner diameter of the ring seal 24 is approximately equal to the diameter of the piston rod 20. The piston rod 20 may also be contoured, for example, with a convex shape conforming to the ring seal 24 cross-sectional shape for greater durability. The ring seal 24 abuts each of the piston rod 20 and the inner surface 8 of the cavity 6 to form a substantially fluid tight or hermetic seal between the rod aperture 10 and the fluid flow ports 12, 14 of the housing 4. In an alternative embodiment, multiple ring seals 24 may be stacked upon one another on the piston rod 20, and separated by a metal washer (not shown) also on the piston rod 20.

In contrast to certain valves known in the art, the valve 2 of the present disclosure does not employ a metal coiled spring to bias the piston head 22. Instead, the ring seal 24 is formed from an elastic material that biases the piston head 22 within the housing 4 of the valve 2. The elastic material may be any material that exhibits minimal permanent set after normal strain cycles associated with the opening and closing of the valve 2 in operation. As one nonlimiting example, the elastic material may include a nitrile polymer (NBR). Other suitably elastic materials may also be employed, as desired.

When the actuator 16 is deactivated, the ring seal 24 biases the piston head 22 toward the fluid flow port 14 formed in the housing 4. The ring seal 24 thereby seals the fluid flow ports 14 to close the valve 2. When the actuator 16 is activated, the ring seal 24 is elastically deformed by an upward moving of the piston head 22 by the actuator 16. The elastic deformation includes a compression of the ring seal 24 between the piston head 22 and the inner surface 8 of the housing 4. Each of the fluid flow ports 12, 14 is thereby unsealed to open the valve 2, and a fluid such as hydrogen gas may flow freely therethrough until the actuator 16 is deactivated.

It should be appreciated that the actuator 16 of the valve 2 selectively interacts with and moves the rod 20 of the piston 18 to open and close the valve 2. The actuator 16 may abut the housing 4, or be spaced apart from the housing 4, as desired. In particular embodiments, the actuator 16 includes an electrically-activated solenoid device 26 known in the art. The solenoid device 26 is in electrical communication with a power source (not shown). The actuator 16 may also include a bore 27 within which the rod 20 is slidably disposed. The solenoid device 26 may surround the bore 27, and be configured to selectively magnetically raise the rod 20 within the bore 27. For example, the rod 20 may be pulled upward by magnetic force into the bore 27 when the solenoid device 26 is activated. The ring seal 24 is elastically deformed when the rod 20 is pulled upward into the bore 27. Upon a deactivation of the solenoid device 26, the ring seal 24 elastically rebounds to an original shape and causes the rod 20 to slide downward in the bore 27. One of ordinary skill in the art should understand that other forms of actuators 16 are also within the scope of the present disclosure.

In particular embodiments, the ring seal 24 has a cross sectional shape that is one of substantially circular and ovoid. For example, the ring seal 24 may be an O-ring seal having a substantially circular cross sectional shape. The same ring seal 24 may have a substantially ovoid cross sectional shape when deformed. In other embodiments, the cross sectional shape of the ring seal 24 includes protrusions that facilitate a deformation and elastic rebound of the ring seal 24 when stressed by the operation of the actuator 16. Other suitable cross sectional shapes may also be employed, as desired.

As should be understood from the above disclosure, the ring seal 24 is elastically deformable and operates in a spring-like fashion within the valve 2 to bias the piston head 22 to the closed position. The maximum piston 18 displacement should be lower than or equal to the maximum allowed deformation of the ring seal 24. The percentage of deformation depends on the material selected and the size and shape of the ring seal 24. Another influence is the shore hardness of the material selected. The ring seal 24 deformation may be optimized based on any of these parameters, as desired.

Illustratively, the ring seal 24 may be deformed up to about twenty percent (20%), and particularly between about ten percent (10%) and about twenty percent (20%), of an unstressed thickness of the ring seal 24 when the actuator 16 is activated. Alternative levels of deformation of the ring seal 24 may also be employed. However, it has been found that deformation greater than twenty percent (20%) may reduce the durability of the ring seal 24 after cycling through compressed and uncompressed states in operation.

In order for the ring seal 24 to elastically deform, for example, by compression inside of the housing 4, an unoccupied volume 28 must exist adjacent the ring seal 24 when the valve 2 is closed. For example, the inner diameter of housing 4 may be higher than the maximum outer diameter of the pre-stressed (20%) ring seal 24.

In certain embodiments, the ring seal 24 is pre-stressed within the housing 4. For example, the ring seal 24 may be compressed between the piston head 22 and the inner surface 8 of the housing 4 when the valve 2 is in the closed position. The desired pre-stressing involves a force balancing between the ring seal 24 deformation forces and the pressure forces related to inlet and outlet pressure at the fluid flow ports 12, 14 and the force of the actuator 16. The pre-stressing of the ring seal 24 provides a closing force sufficient to bias the piston head 22 and seal the one of the fluid flow ports 14 to close the valve 2 when the actuator 16 is deactivated, and particularly after repeated opening and closing of the valve 2. For example, the pre-stressed ring seal 24 may be deformed a percentage of an unstressed thickness of the ring seal 24 when the valve 2 is closed. The percentage may be selected to be greater than a percentage associated with an expected permanent set of the ring seal 24 after the repeated opening and closing of the valve 2. As a nonlimiting example, the pre-stressed ring seal 24 is deformed up to about ten percent (10%) of the unstressed thickness of the ring seal 24 when the valve 2 is closed. The pre-stressing of the ring seal 24 thereby ensures the sufficient closing force throughout the operational lifetime of the valve 2.

The valve 2 of the present disclosure may further include a second ring seal 30. The second ring seal 30 may be disposed on a base of the piston head 22 and provide a substantially fluid tight seal to the sealed one of the fluid flow ports 14 when the actuator 16 is deactivated. In particular embodiments, the second ring seal 30 is an O-ring seal. The second ring seal 30 may be disposed in a groove formed in the base of the piston head 22. Alternative means for providing a substantially fluid tight seal between the piston head 22 and the fluid flow port 14 are also within the scope of the present disclosure.

One of ordinary skill in the art should understand that the valve 2 may be employed in a variety of applications involving selective containment or delivery of high pressure fluids. In one embodiment, the valve 2 may be employed in a pressure vessel system including at least one high-pressure vessel (not shown) in fluid communication with the valve 2. The valve 2 may operate as a shut off valve, for example, of the pressure vessel system. In a further embodiment, the valve 2 may be employed in a fuel cell system (not shown) including a fuel cell stack (not shown). The pressure vessel system may include at least one high pressure hydrogen vessel in fluid communication with the valve 2. The valve 2 may function to selectively deliver hydrogen fuel to the fuel cell stack from the at least one high pressure vessel. It is anticipated that the valve 2 may also be employed in other applications, as desired.

Advantageously, the valve 2 of the present disclosure replaces the slidable O-ring and metal coil spring of the prior art with the elastically deformed ring seal 24. By taking advantage of the elastic deformation of the ring seal 24 thickness or diameter, it is now possible to use the elasticity of the ring seal 24 as a replacement for the metal coil spring. It should be appreciated that no relative movement between the ring seal 24 and the inner surface 8 of the housing 4 occurs during operation, thereby minimizing friction within the valve 2. A remaining friction is only between the piston rod 20 and the guidance of the rod 20 inside the actuator 16. The inner friction of the ring seal material is insignificant. The need for lubrication is thereby minimized in the valve 2 of the present disclosure. Additionally, since there is no relative movement of the ring seal 24, no abrasion of the ring seal 24 can occur and, subsequently, less particle contamination. The minimization of abrasion and particle contamination lowers the risk of valve leakage.

It should be further understood that the elimination of the metal coil spring also advantageously eliminates the need to replace the valve 2 because of hydrogen embrittlement of the metal coil spring, which is known to occur in high pressure systems involving the delivery of hydrogen fuel to the fuel cell stack.

The manufacturing of the valve 2 of the present disclosure is less complicated in comparison to valves known in the art, which have separate metal coil springs and O-rings. The number of parts required to assemble the valve 2 is minimized. Additionally, the inner surface 8 of the valve housing 4 does not require a high degree of finishing due to the employment of the resilient and elastic ring seal 4 as the means for biasing the piston head 22 in the closed position. The inner surface 8 can be relatively rough or harsh in comparison to known valves, which have a smooth finishing that facilitates a slidable movement of the O-rings against the inner walls of the known valve bodies. The manufacturing of the valve 2 is thereby simplified.

While certain representative embodiments and details have been shown for purposes of illustrating the invention, it will be apparent to those skilled in the art that various changes may be made without departing from the scope of the disclosure, which is further described in the following appended claims.

What is claimed is:

1. A valve, comprising:
a housing with a cavity formed therein, the housing further including a rod aperture and a pair of fluid flow ports formed therein and communicating with the cavity;
an actuator disposed adjacent the housing;
a piston having a rod coupled to piston head, the piston head disposed in the cavity of the housing, the rod disposed through the rod aperture and operatively coupled to the actuator; and
a ring seal disposed in the cavity and circumscribing the rod of the piston, the ring seal disposed between the piston head and an inner surface of the housing, the ring seal continuously housing, wherein the ring seal biases the piston head toward one of the fluid flow ports formed in the housing causing the piston head to seal the one of the fluid flow ports to close the calve when the actuator is deactivated, and wherein the ring seal is elastically deformed into a further compressed state causing each of the fluid flow ports to be unsealed to open the valve when the actuator is activated;
wherein the valve does not include a biasing spring.

2. The valve of claim 1, wherein the actuator includes an electrically-activated solenoid device.

3. The valve of claim 2, wherein the actuator includes a bore in which the piston rod is slidably disposed and moved by the solenoid device.

4. The valve of claim 3, wherein the actuator abuts the housing.

5. The valve of claim 1, wherein the ring seal has a cross sectional shape that is one of substantially circular and ovoid.

6. The valve of claim 1, wherein the ring seal is an O-ring seal.

7. The valve of claim 1, wherein the ring seal is elastically deformable up to about twenty percent (20%) of an unstressed thickness of the ring seal.

8. The valve of claim 1, wherein the ring seal abuts each of the piston rod and the inner surface of the cavity, the ring seal forming a substantially fluid tight seal between the rod aperture and the fluid flow ports of the housing.

9. The valve of claim 8, wherein the ring seal contacts a top portion of the inner surface of the cavity, and does not contact a side portion of the inner surface of the cavity.

10. The valve of claim 1, wherein the ring seal is formed from an elastic material.

11. The valve of claim 10, wherein the elastic material is a nitrile polymer.

12. The valve according to claim 1, wherein the ring seal is pre-stressed.

13. The valve according to claim 12, wherein the pre-stressed ring seal provides a closing force sufficient to bias the piston and seal the one of the fluid flow ports to close the valve when the actuator is deactivated after a multitude of operation cycles of the valve.

14. The valve according to claim 13, wherein the pre-stressed ring seal is deformed a percentage of an unstressed thickness of the ring seal when the valve is closed, the percentage greater than a percentage associated with a permanent set of the ring seal after the multitude of operation cycles of the valve.

15. The valve according to claim 14, wherein the pre-stressed ring seal is deformed up to about ten percent (10%) of the unstressed thickness of the ring seal when the valve is closed.

16. The valve according to claim 1, wherein a second ring seal is disposed on a base of the piston head and provides a substantially fluid tight seal to the sealed one of the fluid flow ports when the actuator is deactivated.

17. The valve according to claim 16, wherein the second ring seal is an O-ring seal.

18. A pressure vessel system, comprising:
At least one high-pressure vessel in fluid communication with at least one valve, the at least one valve, comprising a housing with a cavity formed therein, the housing further including a rod aperture and a pair of fluid flow ports formed therein and communicating with the cavity, an actuator disposed adjacent the housing, a piston having a rod coupled to piston head, the piston head disposed in the cavity of the housing, the rod disposed through the rod aperture and operatively coupled to the actuator, and a ring seal disposed in the cavity and circumscribing the rod of the piston, the ring seal disposed between the piston head and an inner surface of the housing, the ring seal continuously housing, wherein the ring seal biases the piston head toward one of the fluid flow ports formed in the housing causing the piston head to seal the one of the fluid flow ports to close the calve when the actuator is deactivated, and wherein the ring seal is elastically deformed into a further compressed state causing each of the fluid flow ports to be unsealed to open the valve when the actuator is activated; wherein the valve does not include a biasing spring.

19. A fuel cell system, comprising:

a fuel cell stack; and a pressure vessel system for delivery of hydrogen to the fuel cell stack, the pressure vessel system including at least one high-pressure vessel in fluid communication with at least one valve, the at least one valve, comprising a housing including a housing with a cavity formed therein, the housing further including a rod aperture and a pair of fluid flow ports formed therein and communicating with the cavity, an actuator disposed adjacent the housing, a piston having a rod coupled to piston head, the piston head disposed in the cavity of the housing, the rod disposed through the rod aperture and operatively coupled to the actuator, and a ring seal disposed in the cavity and circumscribing the rod of the piston, the ring seal disposed between the piston head and an inner surface of the housing, the ring seal continuously housing, wherein the ring seal biases the piston head toward one of the fluid flow ports formed in the housing causing the piston head to seal the one of the fluid flow ports to close the calve when the actuator is deactivated, and wherein the ring seal is elastically deformed into a further compressed state causing each of the fluid flow ports to be unsealed to open the valve when the actuator is activated; wherein the valve does not include a biasing spring.

\* \* \* \* \*